(12) United States Patent
Segawa et al.

(10) Patent No.: US 6,652,415 B2
(45) Date of Patent: Nov. 25, 2003

(54) SLIP CONTROL SYSTEM FOR TORQUE CONVERTER

(75) Inventors: Satoshi Segawa, Kanagawa (JP); Kazutaka Adachi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/983,939

(22) Filed: Oct. 26, 2001

(65) Prior Publication Data

US 2002/0052265 A1 May 2, 2002

(30) Foreign Application Priority Data

Oct. 27, 2000 (JP) ........................................ 2000-328474

(51) Int. Cl.[7] .............................................. F16H 61/58
(52) U.S. Cl. ............................. 477/62; 701/60; 192/3.3; 477/168; 477/176
(58) Field of Search .......................... 477/62, 168, 169, 477/176; 701/60, 58, 67, 68, 74, 90; 192/3.3, 3.31, 3.33; F16H 61/14

(56) References Cited

U.S. PATENT DOCUMENTS

| | | | | |
|---|---|---|---|---|
| 5,060,769 A | * | 10/1991 | Yoshimura et al. | 192/3.29 |
| 5,569,117 A | * | 10/1996 | Kono et al. | 477/169 |
| 5,743,364 A | * | 4/1998 | Oba | 192/3.3 |
| 5,749,061 A | * | 5/1998 | Kono et al. | 701/68 |
| 6,066,072 A | * | 5/2000 | Adachi | 477/176 |

FOREIGN PATENT DOCUMENTS

| | | | | |
|---|---|---|---|---|
| JP | 411141677 A | * | 5/1999 | ........... F16H/61/14 |
| JP | 2000-145948 | | 5/2000 | |

* cited by examiner

*Primary Examiner*—Richard M. Lorence
*Assistant Examiner*—David D. Le
(74) *Attorney, Agent, or Firm*—Foley & Lardner

(57) ABSTRACT

A pre-compensator equipped slip control system for a lock-up torque converter employing a lock-up clutch, includes a slip-rotation control section that begins to calculate a compensated target slip rotation from a time when an actual slip rotation between input and output elements of the torque converter becomes less than a predetermined slip-rotation threshold value after shifting from a torque-converter action area to a slip-control area, so that the actual slip rotation is brought closer to the compensated target slip rotation. Also provided is a feedforward control section that determines a lock-up clutch engagement pressure by way of feedforward control during a period of time from a time when the torque converter is shifted from the torque-converter action area to the slip-control area to the time when the actual slip rotation becomes less than the predetermined slip-rotation threshold value.

20 Claims, 10 Drawing Sheets

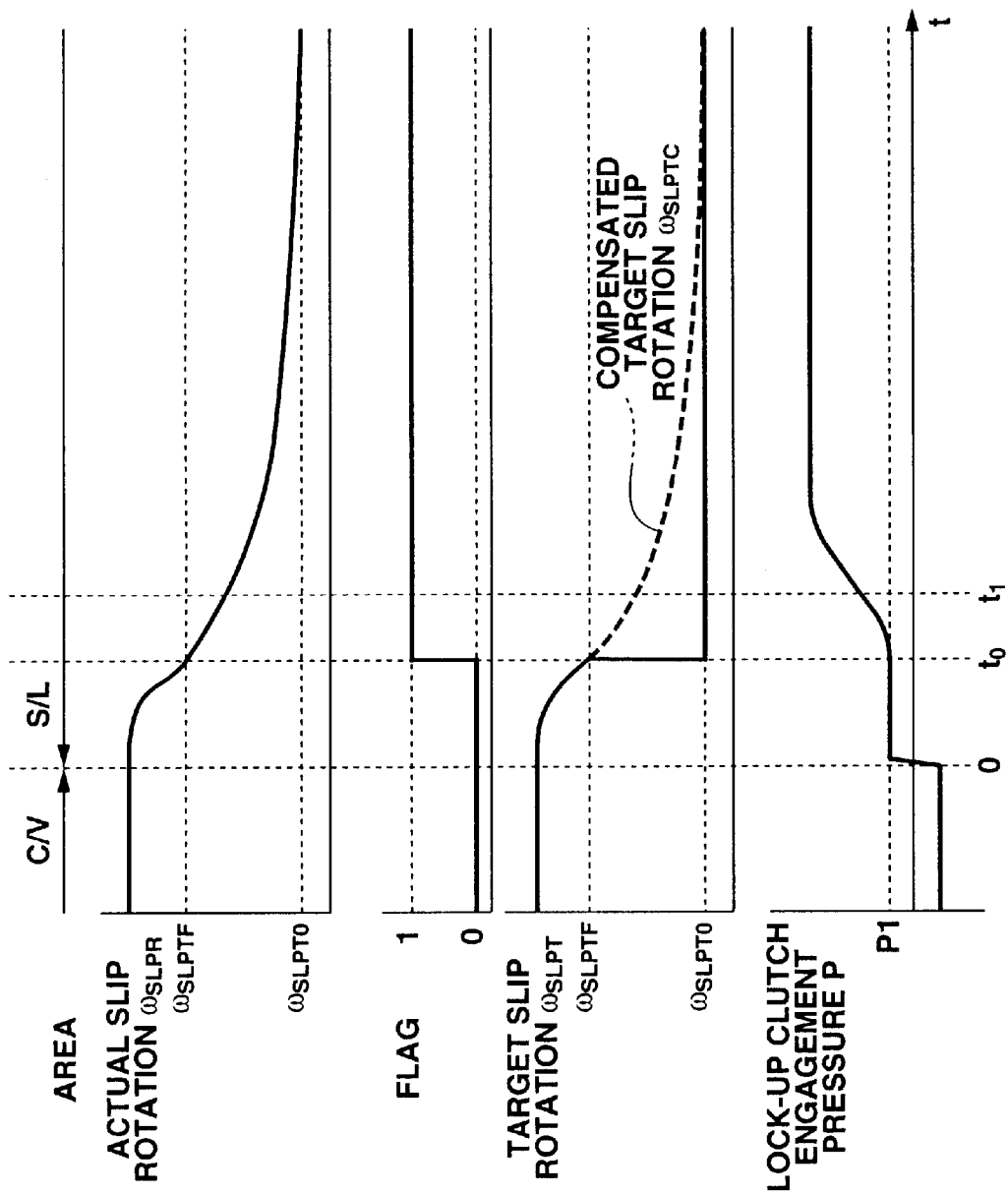

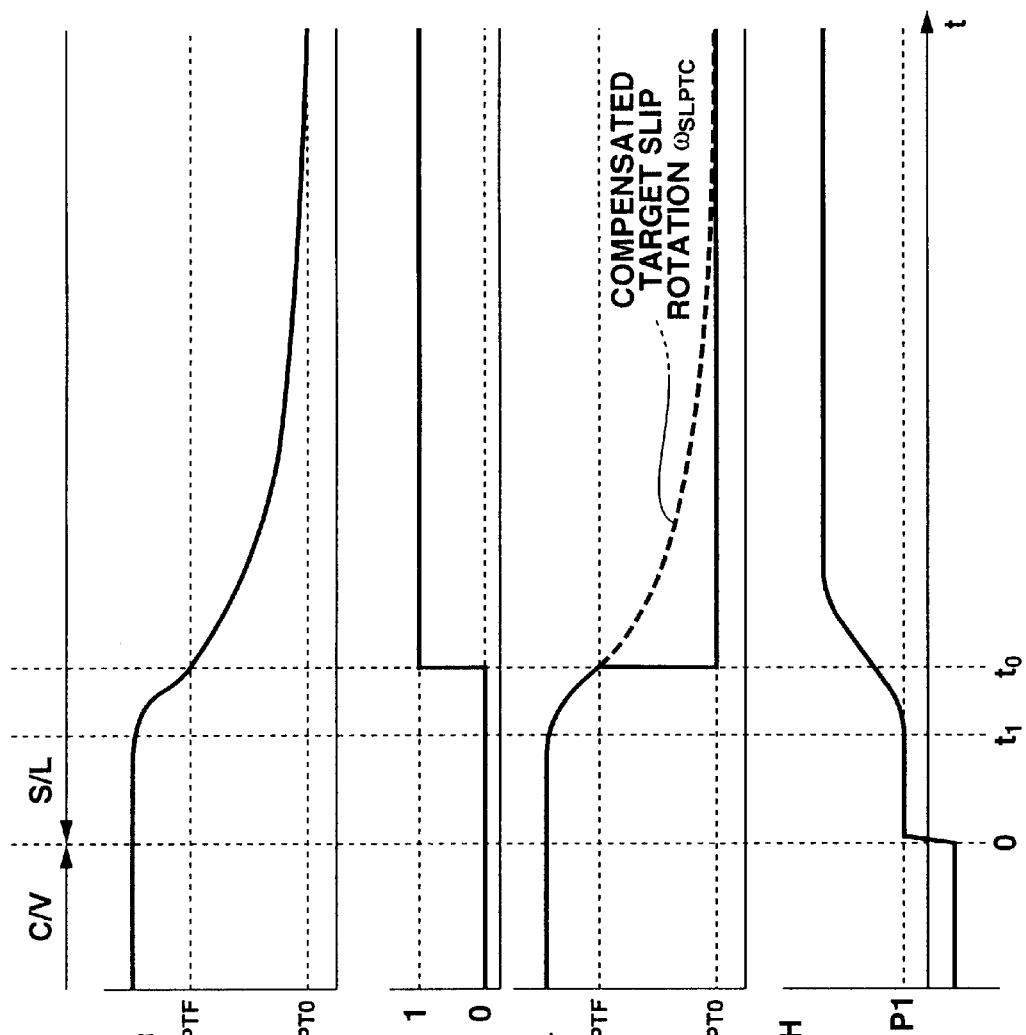

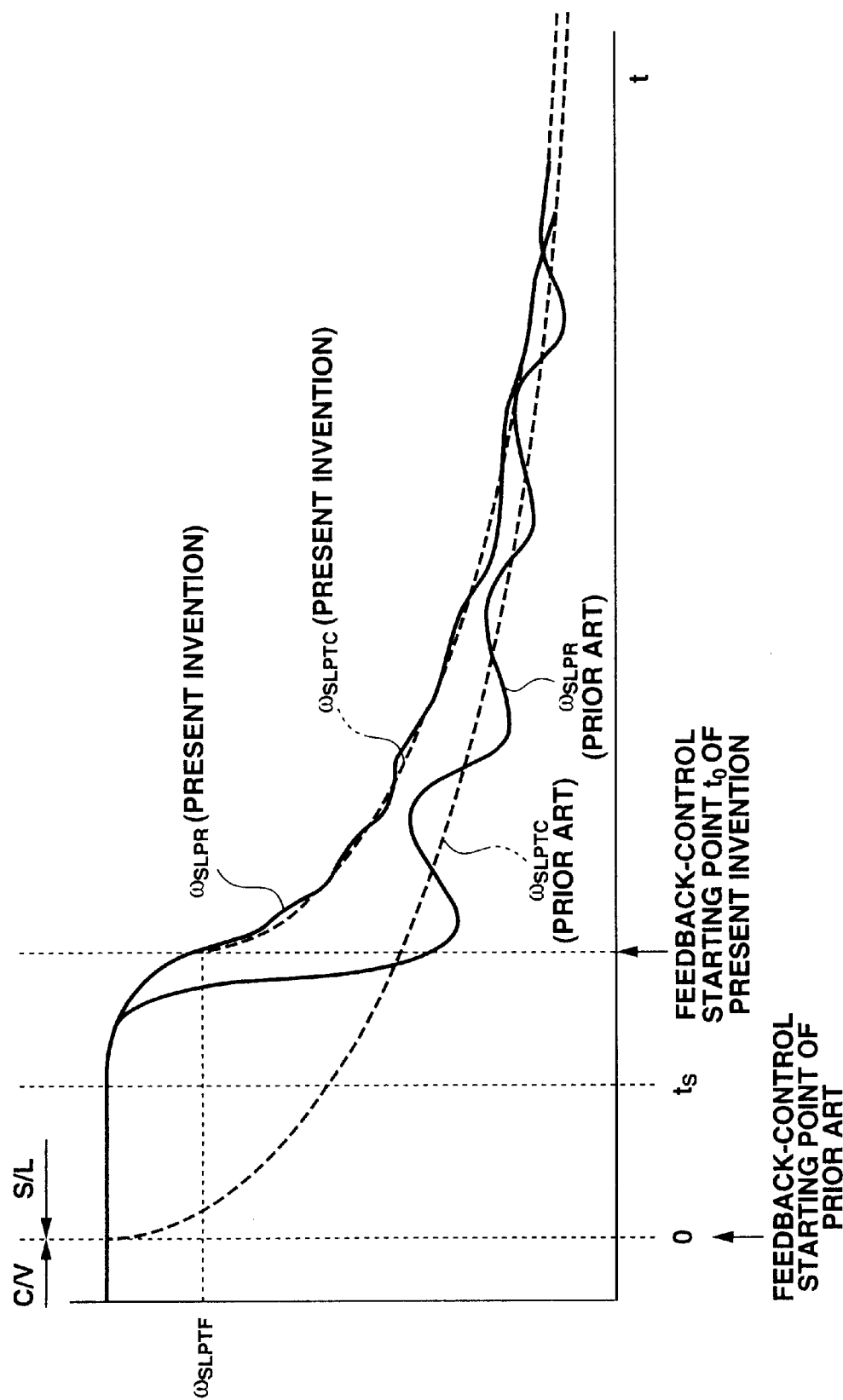

SLIP CONTROL SYSTEM FOR TORQUE CONVERTER

TECHNICAL FIELD

The present invention relates to a slip control system that brings relative rotation, i.e., slip rotation between input and output elements of a torque converter used in an automatic transmission closer to a desired value, and particularly to techniques for slip control during a transition from a non-slip-control area to a slip-control area.

BACKGROUND ART

In recent years, there have been proposed and developed various slip control systems that perform slip control for a torque converter lock-up clutch. A pre-compensator equipped slip control system has been disclosed in Japanese Patent Provisional Publication No. 2000-145948 (hereinafter is referred to as "JP2000-145948"). In the slip control system disclosed in JP2000-145948, instead of directly using a value of target slip rotation (hereinafter is referred to as a "target slip rotation $\omega_{SLPT}$" indicated in terms of an angular velocity), a compensated value of target slip rotation (hereinafter is referred to as a "compensated target slip rotation $\omega_{SLPTC}$") produced by passing target slip rotation $\omega_{SLPT}$ through the pre-compensator is used for slip control. The pre-compensator functions to determine the transient response of the slip control system singly. Slip control is executed so that a value of actual slip rotation (hereinafter is referred to as an "actual slip rotation $\omega_{SLPR}$") is brought closer to the compensated target slip rotation $\omega_{SLPTC}$ filtered or compensated for by means of the pre-compensator. In the system of JP2000-145948, when the torque converter is shifted from the non-slip-control area to the slip-control area, target slip rotation $\omega_{SLPT}$ is switched from actual slip rotation $\omega_{SLPR}$ to a value of required slip rotation (hereinafter is referred to as a "required slip rotation $\omega_{SLPT0}$") based on both a rotational speed of a turbine runner and a throttle opening, and the required slip rotation $\omega_{SLPT0}$ passes through the pre-compensator to produce compensated target slip rotation $\omega_{SLPTC}$, and thus actual slip rotation $\omega_{SLPR}$ is feedback-controlled closer to compensated target slip rotation $\omega_{SLPTC}$ based on required slip rotation $\omega_{SLPT0}$. Therefore, even when shifting from the non-slip-control area to the slip-control area, it is possible to provide a designated transient-response characteristic determined by the pre-compensator, thereby reducing shocks during engagement of the torque converter lock-up clutch.

SUMMARY OF THE INVENTION

In the system of JP2000-145948, arithmetic calculation for compensated target slip rotation $\omega_{SLPTC}$ (corresponding to the transient response), is executed by the pre-compensator immediately when shifting from the non-slip-control area to the slip-control area. On the other hand, an engagement pressure of the lock-up clutch tends to rise with a delay in the response from the time when shifting to the slip-control area. During a period of time that the engagement pressure of the lock-up clutch is still low and thus it is impossible to satisfactorily engage the lock-up clutch, the actual slip rotation cannot be changed. As a result, actual slip rotation $\omega_{SLPR}$ tends to decrease with a response delay from the time when shifting to the slip-control area. During such a time period, compensated target slip rotation $\omega_{SLPTC}$ (corresponding to the transient response) is gradually decreasing, and therefore a deviation or a difference between actual slip rotation $\omega_{SLPR}$ and compensated target slip rotation $\omega_{SLPTC}$ tends to increase. That is, the follow-up performance of actual slip rotation $\omega_{SLPR}$ toward compensated target slip rotation $\omega_{SLPTC}$ is deteriorated. Control constants for the pre-compensator are preset or preprogrammed so that the transient response is optimized when target slip rotation $\omega_{SLPT}$ is changing in the slip-control area. However, the value of actual slip rotation $\omega_{SLPR}$ occurring at the beginning of shifting to the slip-control area tends to be considerably higher than the value of target slip rotation $\omega_{SLPT}$ computed in the slip-control area. In other words, there is a great deviation between actual slip rotation $\omega_{SLPR}$ occurring at the beginning of shifting to the slip-control area and target slip rotation $\omega_{SLPT}$ computed in the slip-control area. Thus, it is difficult to provide an optimal transient performance by computing the transient response (compensated target slip rotation $\omega_{SLPTC}$) by means of the pre-compensator during shifting to the slip-control area (including initial stages of shifting to the slip-control area) from the transient response characteristic preprogrammed to be suitable to the time when target slip rotation $\omega_{SLPT}$ is changing in the slip-control area. In a similar manner, in a feed-back control system arranged at the back of the pre-compensator, assuming that control constants or control gains for the feed-back control system are preset or preprogrammed to be suitable to the time when target slip rotation $\omega_{SLPT}$ is changing in the slip-control area, there is a possibility that an optimal response of the feed-back control system cannot be obtained during shifting to the slip-control area. In case of the slip control for the torque converter, the system control responsiveness obtained during a period of time in which actual slip rotation $\omega_{SLPR}$ is converging to target slip rotation $\omega_{SLPT}$, exerts a great influence upon the driver's feeling. In particular, if the slip rotation becomes excessively small and thus the torque converter lock-up clutch temporarily shifts to its fully engaged state, undesirable shocks occur. To enhance the transient performance during the transition from the non-slip-control area to the slip-control area, a pre-compensator suitable to the transient response during the transition from the non-slip-control area to the slip-control area can be further added, or control constants suitable for during the transition from the non-slip-control area to the slip-control area can be preprogrammed in addition to the control constants suitable for the time when target slip rotation $\omega_{SLPT}$ is changing in the slip-control area. In such a case, the control logic of the control system is very troublesome.

Accordingly, it is an object of the invention to provide a pre-compensator equipped slip control system for a torque converter, which avoids the aforementioned disadvantages.

It is another object of the invention to provide a pre-compensator equipped slip control system for a torque converter which is capable of improving the follow-up performance of actual slip rotation $\omega_{SLPR}$ toward compensated target slip rotation $\omega_{SLPTC}$ filtered or compensated for by means of the pre-compensator without complicating the control logic.

In order to accomplish the aforementioned and other objects of the present invention, a slip control system for a torque converter employing a lock-up clutch, comprises a pre-compensator that determines a follow-up characteristic of an actual value of a controlled quantity to a desired value of slip rotation between input and output elements of the torque converter and makes a filtering process to a target slip rotation corresponding to the desired value of slip rotation to produce a compensated target slip rotation, a feedforward control section that determines a lock-up clutch engagement pressure by way of feedforward control during a period of time from a time when the torque converter is shifted from a torque-converter action area to a slip-control area to a time when an actual slip rotation corresponding to the actual value of the controlled quantity becomes less than a predetermined slip-rotation threshold value, a feedback control section that controls the lock-up clutch engagement pressure by way of feedback control from the time when the actual slip rotation becomes less than the predetermined slip-rotation threshold value after shifting to the slip-control area, so that the actual slip rotation is brought closer to the compensated target slip rotation, the pre-compensator being initialized by the actual slip rotation at the time when the actual slip rotation becomes less than the predetermined slip-rotation threshold value after shifting to the slip-control area, and a target slip rotation switching section that switches the target slip rotation from the actual slip rotation to a required slip rotation based on engine and vehicle operating conditions at the time when the actual slip rotation becomes less than the predetermined slip-rotation threshold value after shifting to the slip-control area.

According to another aspect of the invention, a slip control system for a torque converter employing a lock-up clutch, comprises a pre-compensating means for determining a follow-up characteristic of an actual value of a controlled quantity to a desired value of slip rotation between input and output elements of the torque converter and for making a filtering process to a target slip rotation corresponding to the desired value of slip rotation to produce a compensated target slip rotation, a feedforward control means for determining a lock-up clutch engagement pressure by way of feedforward control during a period of time from a time when the torque converter is shifted from a torque-converter action area to a slip-control area to a time when an actual slip rotation corresponding to the actual value of the controlled quantity becomes less than a predetermined slip-rotation threshold value, a feedback control means for controlling the lock-up clutch engagement pressure by way of feedback control from the time when the actual slip rotation becomes less than the predetermined slip-rotation threshold value after shifting to the slip-control area, so that the actual slip rotation is brought closer to the compensated target slip rotation, the pre-compensating means being initialized by the actual slip rotation at the time when the actual slip rotation becomes less than the predetermined slip-rotation threshold value after shifting to the slip-control area, and a target slip rotation switching means for switching the target slip rotation from the actual slip rotation to a required slip rotation based on engine and vehicle operating conditions at the time when the actual slip rotation becomes less than the predetermined slip-rotation threshold value after shifting to the slip-control area.

According to a further aspect of the invention, a method for controlling slip rotation between input and output elements of a torque converter employing a lock-up clutch, the method comprises determining a filter constant by which a transient response is determined, pre-compensating a target slip rotation corresponding to a desired value of slip rotation at the filter constant by way of a pre-compensator to produce a compensated target slip rotation, feedforward-controlling a lock-up clutch engagement pressure during a period of time from a time when the torque converter is shifted from a torque-converter action area to a slip-control area to a time when an actual slip rotation corresponding to an actual value of a controlled quantity becomes less than a predetermined slip-rotation threshold value, feedback-controlling the lock-up clutch engagement pressure from the time when the actual slip rotation becomes less than the predetermined slip-rotation threshold value after shifting to the slip-control area, so that the actual slip rotation is brought closer to the compensated target slip rotation, initializing the pre-compensator by the actual slip rotation at the time when the actual slip rotation becomes less than the predetermined slip-rotation threshold value after shifting to the slip-control area, and switching the target slip rotation from the actual slip rotation to a required slip rotation based on engine and vehicle operating conditions at the time when the actual slip rotation becomes less than the predetermined slip-rotation threshold value after shifting to the slip-control area.

According to a still further aspect of the invention, a method for controlling slip rotation between input and output elements of a torque converter employing a lock-up clutch, the method comprises determining, based on a throttle opening and a transmission output speed, whether the torque converter is in a torque-converter action area, in a slip-control area, or in a lock-up engagement area, calculating a required slip rotation based on the throttle opening and a turbine speed, calculating an actual slip rotation as a difference between a pump-impeller speed and the turbine speed, determining a filter constant by which a transient response is determined, pre-compensating a target slip rotation corresponding to a desired value of slip rotation at the filter constant by way of a pre-compensator to produce a compensated target slip rotation, switching the target slip rotation from the actual slip rotation to the required slip rotation at the time when the actual slip rotation becomes less than a predetermined slip-rotation threshold value after shifting from the torque-converter action area to the slip-control area, feedforward-controlling a lock-up clutch engagement pressure during a period of time from a time when the torque converter is shifted from the torque-converter action area to the slip-control area to a time when the actual slip rotation corresponding to an actual value of a controlled quantity becomes less than the predetermined slip-rotation threshold value, feedback-controlling the lock-up clutch engagement pressure from the time when the actual slip rotation becomes less than the predetermined slip-rotation threshold value after shifting to the slip-control area, so that the actual slip rotation is brought closer to the compensated target slip rotation, and initializing the pre-compensator by the actual slip rotation at the time when the actual slip rotation becomes less than the predetermined slip-rotation threshold value after shifting to the slip-control area.

According to another aspect of the invention, a slip control system for a torque converter employing a lock-up clutch comprises a slip-control area section that determines whether the torque converter is in a torque-converter action area or in a slip-control area according to a throttle opening and a vehicle speed, a feedforward control section that determines a lock-up clutch engagement pressure by way of feedforward control for a predetermined period when the torque converter is shifted from the torque-converter action area to the slip-control area, a required slip rotation calculation section that calculates a required slip rotation between input and output elements of the torque converter based on engine operating conditions, a pre-compensator that determines a controlled transient characteristic of an actual slip rotation to the required slip rotation and makes a compensated target slip rotation corresponding to the controlled transient characteristic after the predetermined period, and a feedback control section that controls the lock-up clutch engagement pressure by way of feedback control so that the actual slip rotation is brought closer to the compensated target slip rotation.

According to another aspect of the invention, a slip control system for a torque converter employing a lock-up clutch comprises a slip-control area section that determines whether the torque converter is in a torque-converter action area or in a slip-control area according to a throttle opening and a vehicle speed, a feedforward control section that determines a lock-up clutch engagement pressure by way of feedforward control when the torque converter is shifted from the torque-converter action area to the slip-control area, a required slip rotation calculation section that calculates a required slip rotation between input and output elements of the torque converter based on engine operating conditions, a pre-compensator that determines a controlled transient characteristic of an actual slip rotation to the required slip rotation and makes a compensated target slip rotation corresponding to the controlled transient characteristic when the actual slip rotation becomes less than a predetermined slip rotation, and a feedback control section that controls the lock-up clutch engagement pressure by way of feedback control so that the actual slip rotation is brought closer to the compensated target slip rotation.

The other objects and features of this invention will become understood from the following description with reference to the accompanying drawings.

BRIEF DESCRIPTION OF THE DRAWINGS

FIGS. 10A–10D are time charts showing one example of slip control executed by the system of the embodiment.

FIGS. 11A–11D are time charts showing another example of slip control executed by the system of the embodiment.

FIG. 12 is a time chart showing a comparison between variations in actual slip rotation $\omega_{SLPR}$ brought closer to compensated target slip rotation $\omega_{SLPTC}$ in the prior-art system of JP2000-145948 and variations in actual slip rotation $\omega_{SLPR}$ brought closer to compensated target slip rotation $\omega_{SLPTC}$ in the improved system of the embodiment.

DESCRIPTION OF THE PREFERRED EMBODIMENTS

Figure 1:
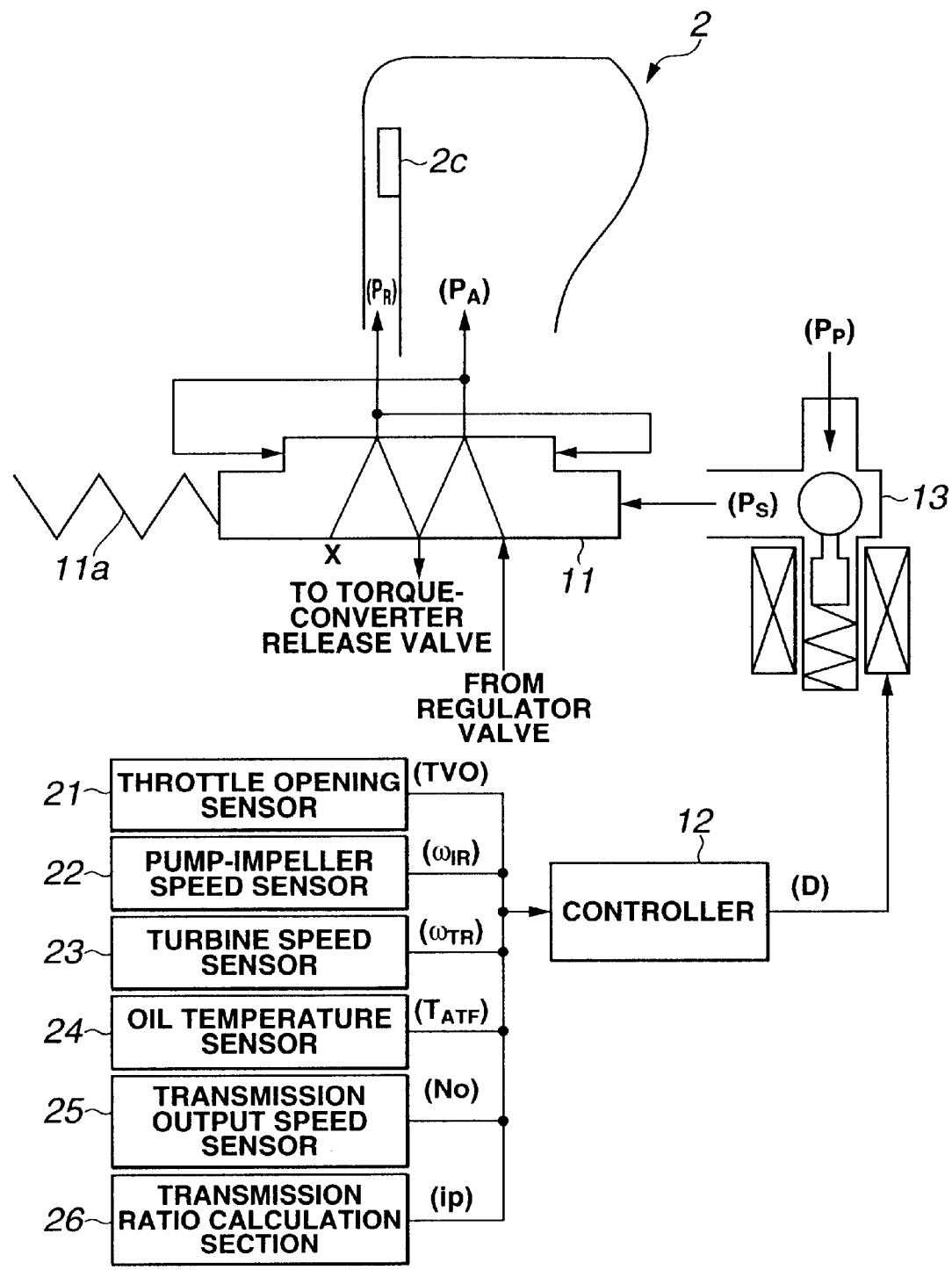
FIG. 1 is a system block diagram illustrating a torque converter control system employing a slip control system of the embodiment.
Figure 2:
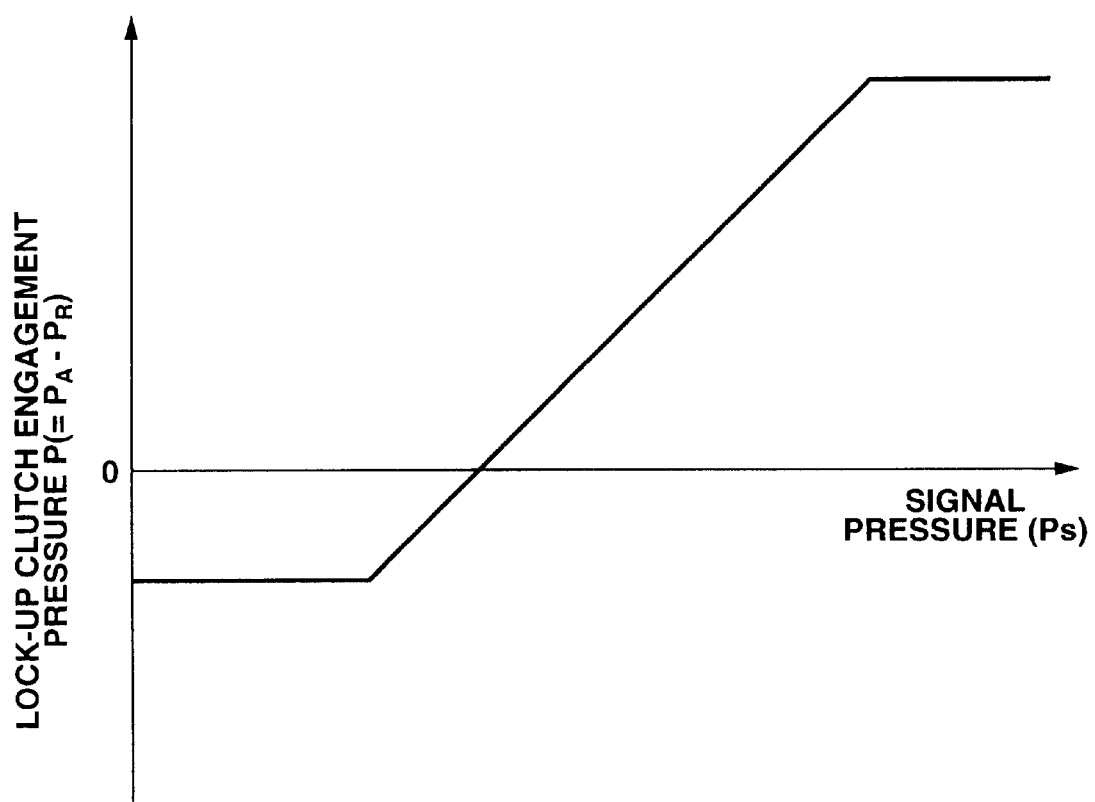
FIG. 2 is a predetermined characteristic diagram illustrating the relationship between a signal pressure Ps generated from a lock-up solenoid valve and a lock-up clutch engagement pressure P ($=P_A-P_R$).

Referring now to the drawings, particularly to FIG. 1, there is shown a partial cross-sectional view of a so-called lock-up torque converter 2 used in an automatic transmission and a system block diagram of a torque converter control system employing a slip control system through which relative rotation (that is, slip rotation) between an input element (a pump impeller) and an output element (a turbine runner) is brought closer to a desired value. In a conventional manner, the pump impeller (serving as the input element or the driving member) is connected to an engine crankshaft (not shown), while the turbine runner is connected to a transmission input shaft of the automatic transmission or a turbine shaft. The transmission torque converter is locked up by applying or engaging a lock-up clutch 2c disposed between the pump impeller and the turbine runner and by directly coupling the pump impeller with the turbine runner via lock-up clutch 2c. A clutch engagement force of lock-up clutch 2c is determined by the differential pressure ($P_A-P_R$) between an apply pressure $P_A$ on the applied side of lock-up clutch 2c and a release pressure PR on the released side of lock-up clutch 2c. Differential pressure ($P_A-P_R$) will be hereinafter referred to as a "lock-up clutch engagement pressure P". Concretely, when apply pressure $P_A$ is lower than release pressure $P_R$, lock-up clutch 2c is released and thus the pump impeller and the turbine runner are uncoupled from each other. In this case, lock-up torque converter 2 is in the torque-converter state or within the torque-converter action area C/V (see the area denoted by C/V in FIG. 6) without limiting slippage between the input and output elements of torque converter 2. Conversely when apply pressure $P_A$ is higher than release pressure $P_R$, the lock-up clutch can be partly applied or engaged by the magnitude of a clutch engagement force corresponding to lock-up clutch engagement pressure P ($=P_A-P_R$), and thus slip between the input and output elements of torque converter 2 is limited depending upon the clutch engagement force based on clutch engagement pressure P. Under this condition, torque converter 2 is in the slip-control state or within the slip-control area S/L (see the area denoted by S/L in FIG. 6) with limited or controlled slippage between the input and output elements. When clutch engagement pressure P, that is, pressure differential ($P_A-P_R$) exceeds a predetermined set pressure (a predetermined pressure threshold value), lock-up clutch 2c is completely engaged and there is no relative rotation between the pump impeller and the turbine runner and thus the torque converter is locked up. In this case, torque converter 2 is in the lock-up state or within the lock-up engagement area L/U (see the area denoted by L/U in FIG. 6) with no slippage between the input and output elements. The slip control system includes a slip control valve 11 and a lock-up solenoid valve 13. Lock-up solenoid valve 13 is duty-controlled by a controller 12 to generate a signal pressure Ps at a controlled duty cycle or a controlled duty ratio D. Slip control valve 11 acts to control lock-up clutch engagement pressure P ($=P_A-P_R$) in response to signal pressure Ps from lock-up solenoid valve 13. Lock-up solenoid valve 13 receives a pilot pressure Pp as an initial pressure and functions to rise a pressure level of signal pressure Ps as duty ratio D of lock-up solenoid valve 13 increases. As can be appreciated from hydraulic-pressure lines acting on the valve spool of slip control valve 11 in FIG. 1, the valve spool of slip control valve 11 receives both signal pressure Ps and release pressure $P_R$ fed back to one axial end of the spool from the release pressure line. On the other hand, the spring bias of a return spring 11a and apply pressure $P_A$ fed back both act the other axial end of the valve spool of slip control valve 11. As can be appreciated from the predetermined signal pressure Ps versus clutch engagement pressure P characteristic diagram of FIG. 2, when duty ratio D of lock-up solenoid valve 13 is less than or equal to a first duty ratio corresponding to a first signal pressure, lock-up clutch engagement pressure P (=$P_A$-$P_R$) is held at a predetermined negative pressure value. When duty ratio D of lock-up solenoid valve 13 exceeds a second duty ratio corresponding to a second signal pressure and higher than the first duty ratio, clutch engagement pressure P (=$P_A$-$P_R$) is held at a predetermined positive pressure value. When duty ratio D increases from the first duty ratio to the second duty ratio, that is, when signal pressure Ps increases from the first signal pressure to the second signal pressure, lock-up clutch engagement pressure P (=$P_A$-$P_R$) gradually rises substantially in a linear fashion. In FIG. 2, the negative pressure value of lock-up clutch engagement pressure P (=$P_A$-$P_R$) means the inequality $P_R$>$P_A$, that is, the torque-converter state of torque converter 2. In contrast, the positive pressure value of lock-up clutch engagement pressure P (=$P_A$-$P_R$) means the inequality $P_R$<$P_A$. In this case, the clutch engagement force of lock-up clutch 2c increases (that is, the limit for slip rotation of torque converter 2 increases) as the positive pressure value of lock-up clutch engagement pressure P increases. When the clutch engagement force of lock-up clutch 2c exceeds a predetermined threshold value owing to a rise in lock-up clutch engagement pressure P, torque converter 2 is locked up. In other words, the clutch engagement force exceeding the predetermined threshold value means the lock-up state of torque converter 2. Controller 12 generally comprises a microcomputer. Controller 12 includes an input/output interface (I/O), memories (RAM, ROM), and a microprocessor or a central processing unit (CPU). The input/output interface (I/O) of controller 12 receives input information from various engine/vehicle sensors, namely a throttle opening sensor 21, an impeller speed sensor 22, a turbine speed sensor 23, an oil temperature sensor 24, and a transmission output speed sensor 25. Throttle opening sensor 21 detects a throttle opening TVO regarded as engine load. Impeller speed sensor 22 detects a pump-impeller speed $\omega_{IR}$ (corresponding to engine speed). Turbine speed sensor 23 detects a turbine-runner speed $\omega_{TR}$. Oil temperature sensor 24 detects an operating oil temperature $T_{ATF}$ of the automatic transmission (torque converter 2). Transmission output speed sensor 25 detects a transmission output speed No (exactly, a transmission output shaft speed regarded as vehicle speed). The I/O interface of controller 12 also receives calculation results concerning a transmission ratio ip (or a gear ratio) calculated by means of a transmission ratio calculation section 26. Within the controller, the central processing unit (CPU) allows the access by the I/O interface of input informational data signals from the previously-discussed engine/vehicle sensors. The CPU of controller 12 is responsible for carrying the slip control program stored in memories and is capable of performing necessary arithmetic and logic operations needed to determine duty ratio D of lock-up solenoid valve 13 (see the block diagram shown in FIG. 3). Computational results (arithmetic calculation results), that is, a calculated output signal (lock-up solenoid drive current) is relayed via the output interface circuitry of the controller to output stages, namely lock-up solenoid 13.

Figure 3:
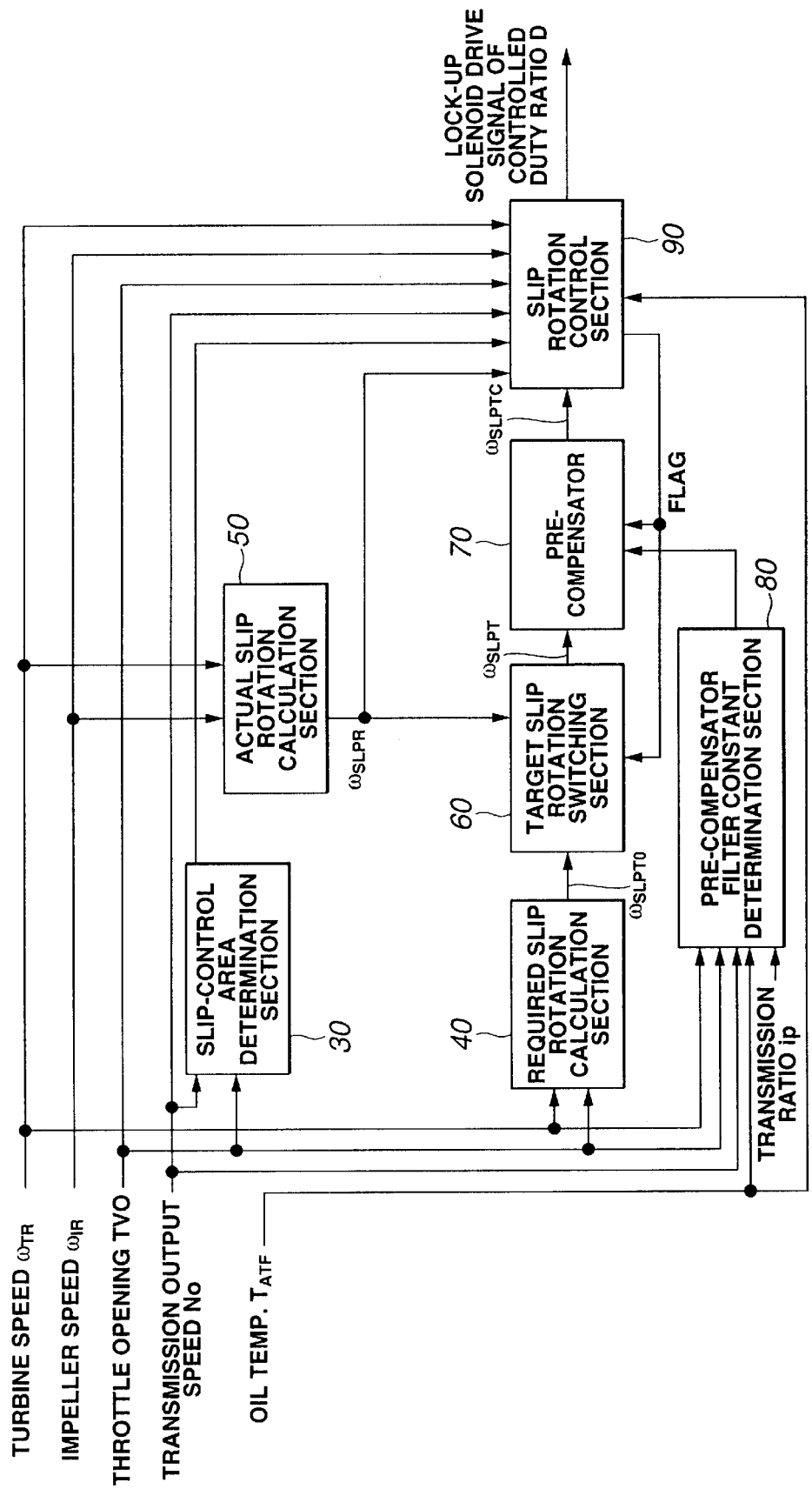
FIG. 3 is a block diagram showing arithmetic-logic sections (the function and operation of computer components) of a controller incorporated in the slip control system of the embodiment.

Referring now to FIG. 3, there is shown the details of arithmetic and logic operations executed within controller 12 incorporated in the slip control system of the embodiment.

Figure 6:
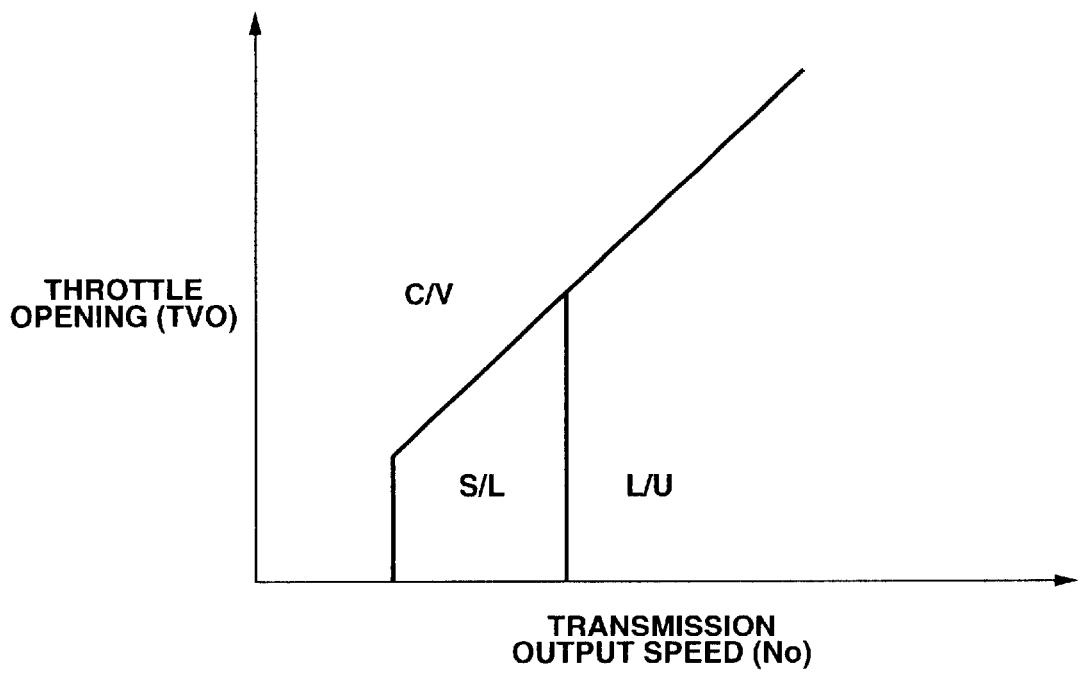
FIG. 6 is a predetermined map illustrating a non-slip-control area (that is, a lock-up disengagement area or a torque-converter action area C/V and a lock-up engagement area L/U) and a slip-control area S/L.
Figure 7:
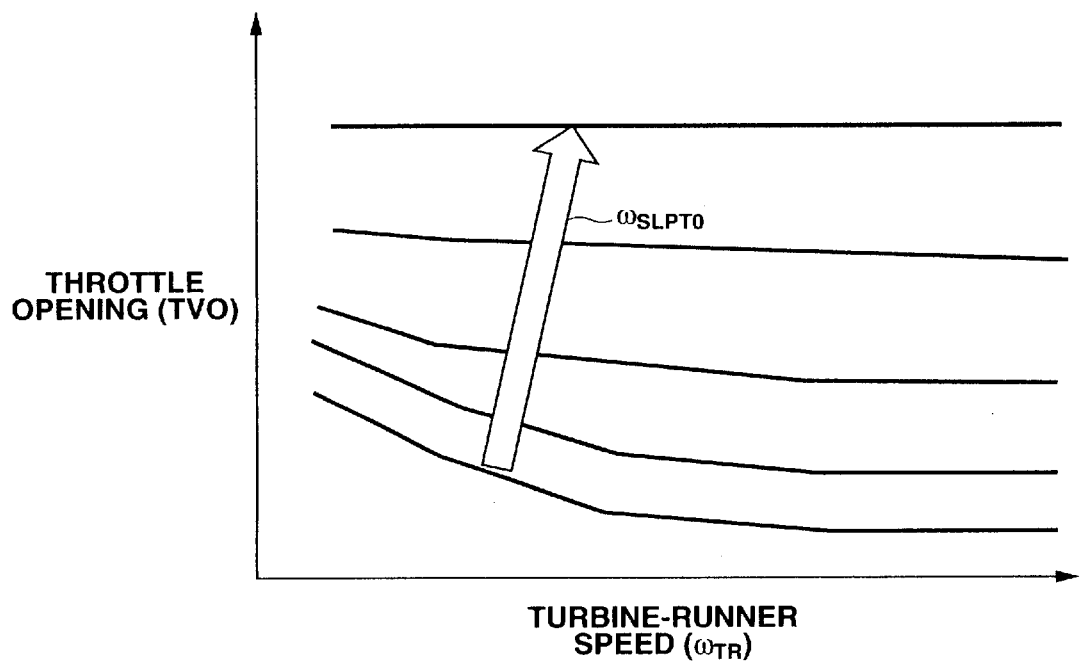
FIG. 7 is a preprogrammed characteristic map showing the relationship between an engine/vehicle operating condition (that is, a throttle opening TVO and a turbine-runner speed $\omega_{TR}$) and a required slip rotation $\omega_{SLPT0}$.

The controller includes a slip-control area determination section 30, a required slip rotation calculation section 40, an actual slip rotation calculation section 50, a target slip rotation switching section 60, a pre-compensator 70, a pre-compensator filter constant determination section 80, and a slip rotation control section 90. Slip-control area determination section 30 receives both throttle opening TVO and transmission output speed No, and determines whether the torque converter is in the torque-converter state (that is, within torque-converter action area C/V), in the slip-control state (that is, within slip-control area S/L), or in the lock-up state (that is, within lock-up engagement area L/U). Actually, the state of torque converter 2 is map-retrieved from the predetermined map of FIG. 6 showing how three different areas C/V, S/L, and L/U are classified by both throttle opening TVO and transmission output speed No. The decision result of slip-control area determination section 30 is input into slip rotation control section 90. Required slip rotation calculation section 40 calculates a required slip rotation $\omega_{SLPT0}$ based on engine/vehicle operating conditions. Actually, required slip rotation $\omega_{SLPT0}$ is retrieved from the predetermined or preprogrammed engine/vehicle operating conditions versus required slip rotation characteristic map of FIG. 7 how required slip rotation $\omega_{SLPT0}$ varies relative to both throttle opening TVO and turbine-runner speed $\omega_{TR}$. In the preprogrammed characteristic map of FIG. 7, required slip rotation $\omega_{SLPT0}$ is experimentally determined and set to the smallest possible slip-rotation angular velocity without torque fluctuations and booming noises in the vehicle compartment. Actually, in order to reduce undesired torque fluctuations and to attenuate undesired booming noises, the lower the turbine-runner speed $\omega_{TR}$, the greater a set value of required slip rotation $\omega_{SLPT0}$. Additionally, the greater the throttle opening TVO (corresponding to the magnitude of a required driving force), the greater a set value of required slip rotation $\omega_{SLPT0}$, so that a lack of input torque transferred from the torque converter to the automatic transmission never occurs during slip control in the presence of a great driving torque requirement. Actual slip rotation calculation section 50 of FIG. 3 arithmetically calculates an actual slip rotation $\omega_{SLPR}$ by subtracting turbine-runner speed $\omega_{TR}$ from pump-impeller speed $\omega_{IR}$. That is to say, actual slip rotation $\omega_{SLPR}$ is derived from the equation $\omega_{SLPR}=\omega_{IR}-\omega_{TR}$. The computational result of actual slip rotation calculation section 50 is input into both target slip rotation switching section 60 and slip rotation control section 90. Target slip rotation switching section 60 is responsive to a feedback control flag FLAG (described later) so as to switch a target slip rotation $\omega_{SLPT}$ between required slip rotation $\omega_{SLPT0}$ and actual slip rotation $\omega_{SLPR}$ (see FIG. 4). The operation of target slip rotation switching section 60 is hereunder described in detail in reference to the flow chart of FIG. 4.

At step S61, a check is made to determine whether the feedback control flag FLAG is set (=1) or reset (=0). FLAG=1 means that slip rotation control section 90 is conditioned in a feedback control mode. In contrast, FLAG=0 means that slip rotation control section 90 is conditioned out of the feedback control mode, in other words, slip rotation control section 90 is conditioned in a non-feedback control mode. When the answer to step S61 is affirmative (FLAG=1), that is, during the feedback control mode, the routine proceeds from step S61 to step S62. At step S62, a current value of target slip rotation $\omega_{SLPT}$ is updated by required slip rotation $\omega_{SLPT0}$ based on the current engine/vehicle operating conditions (namely, more recent data of throttle opening TVO and turbine speed $\omega_{TR}$). In case of FLAG=1, a current value of required slip rotation $\omega_{SLPT0}$ based on the current engine/vehicle operating conditions is output as target slip rotation $\omega_{SLPT}$. Conversely when the answer to step S61 is negative (FLAG=0), that is, during the non-feedback control mode, the routine proceeds from step S61 to step S63. At step S63, a current value of target slip rotation $\omega_{SLPT}$ is updated by a current value of actual slip rotation $\omega_{SLPR}$ (=$\omega_{IR}$−$\omega_{TR}$). In case of FLAG=0, a current value of actual slip rotation $\omega_{SLPR}$ is output as target slip rotation $\omega_{SLPT}$. Steadily, the slip-rotation control of torque converter 2 means that actual slip rotation $\omega_{SLPR}$ (=$\omega_{IR}$−$\omega_{TR}$) is brought closer to target slip rotation $\omega_{SLPT}$. Hereinafter described in detail, the system of the embodiment is capable of properly determining or estimating a transient characteristic in a transient state that actual slip rotation $\omega_{SLPR}$ (=$\omega_{IR}$−$\omega_{TR}$) is adjusted or converged closer to target slip rotation $\omega_{SLPT}$, depending upon various factors and demands. For this purpose, target slip rotation $\omega_{SLPT}$ itself is not directly used for slip control. Pre-compensator 70 serves to determine a follow-up characteristic of an actual value of a controlled quantity (corresponding to actual slip rotation $\omega_{SLPR}$) to a desired value (corresponding to target slip rotation $\omega_{SLPT}$) of slip rotation between input and output elements of the torque converter. Target slip rotation $\omega_{SLPT}$ is pre-compensated for by means of pre-compensator 70 and pre-compensator filter constant determination section 80 to produce a compensated target slip rotation $\omega_{SLPTC}$, and then compensated target slip rotation $\omega_{SLPTC}$ is used for slip control. Pre-compensator filter constant determination section 80 functions to determine a filter constant for pre-compensator 70 based on throttle opening TVO, turbine-runner speed $\omega_{TR}$, operating oil temperature $T_{ATF}$, transmission output speed No, and transmission ratio ip. When feedback control flag FLAG is set to "1", that is, during the feedback control mode, pre-compensator 70 operates to make a filtering process (a pre-compensation) to target slip rotation $\omega_{SLPT}$ at the filter constant determined by means of pre-compensator filter constant determination section 80, to produce, calculate or compute a compensated target slip rotation $\omega_{SLPTC}$ that actual slip rotation $\omega_{SLPR}$ is brought closer to target slip rotation $\omega_{SLPT}$ in accordance with the controlled transient characteristic. The controlled transient characteristic can be set to a desired value or set point based on engineer's wishes. For instance, the controlled transient characteristic may be constructed by a time lag filter of first order, represented by the following expression.

$$\omega_{SLPTC} = \{1/(T_T \cdot s + 1)\} \cdot \omega_{SLPR}$$

where $\omega_{SLPTC}$ denotes the compensated target slip rotation, $\omega_{SLPR}$ denotes the actual target slip rotation, $T_T$ denotes a delay time, and s is a Laplace variable.

Figure 4:
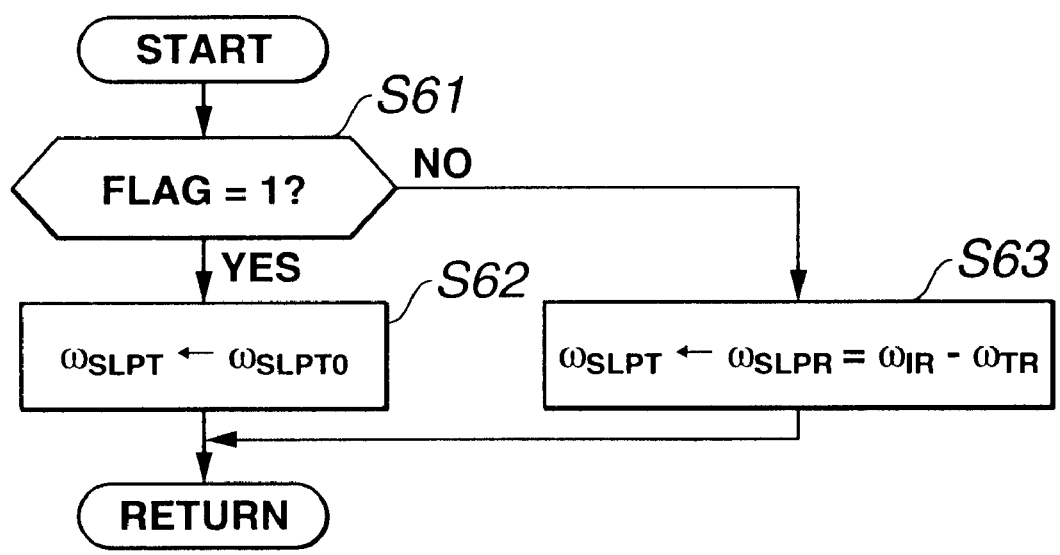
FIG. 4 is a flow chart illustrating a target slip rotation switching program executed by a target slip rotation switching section 60 shown in the block diagram of FIG. 3.

In contrast, when feedback control flag FLAG is reset to "0", that is, during the non-feedback control mode, pre-compensator 70 is initialized by target slip rotation $\omega_{SLPT}$ updated or replaced by actual slip rotation $\omega_{SLPR}$ (see the flow from step S61 to step S63 in FIG. 4). Note that a timing of initialization for pre-compensator 70 (in other words, a feedback-control starting point) in the system of the embodiment is different from that in the conventional system (as will be fully described later in reference to the time chart shown in FIG. 12).

As appreciated from signal lines shown in FIG. 3, slip rotation control section 90 receives compensated target slip rotation $\omega_{SLPTC}$ from pre-compensator 70, and additionally receives the other input informational data, namely throttle opening TVO, pump-impeller speed $\omega_{IR}$ (engine speed), turbine-runner speed $\omega_{TR}$, operating oil temperature $T_{ATF}$, transmission output speed No (regarded as vehicle speed), actual slip rotation $\omega_{SLPR}$, and the decision result generated from slip-control area determination section 30. Based on these input informational data, slip rotation control section 90 executes the slip-rotation control program shown in FIG. 5, in order to achieve slip control (in other words, to determine duty ratio D of lock-up solenoid valve 13) as discussed hereunder.

Figure 5:
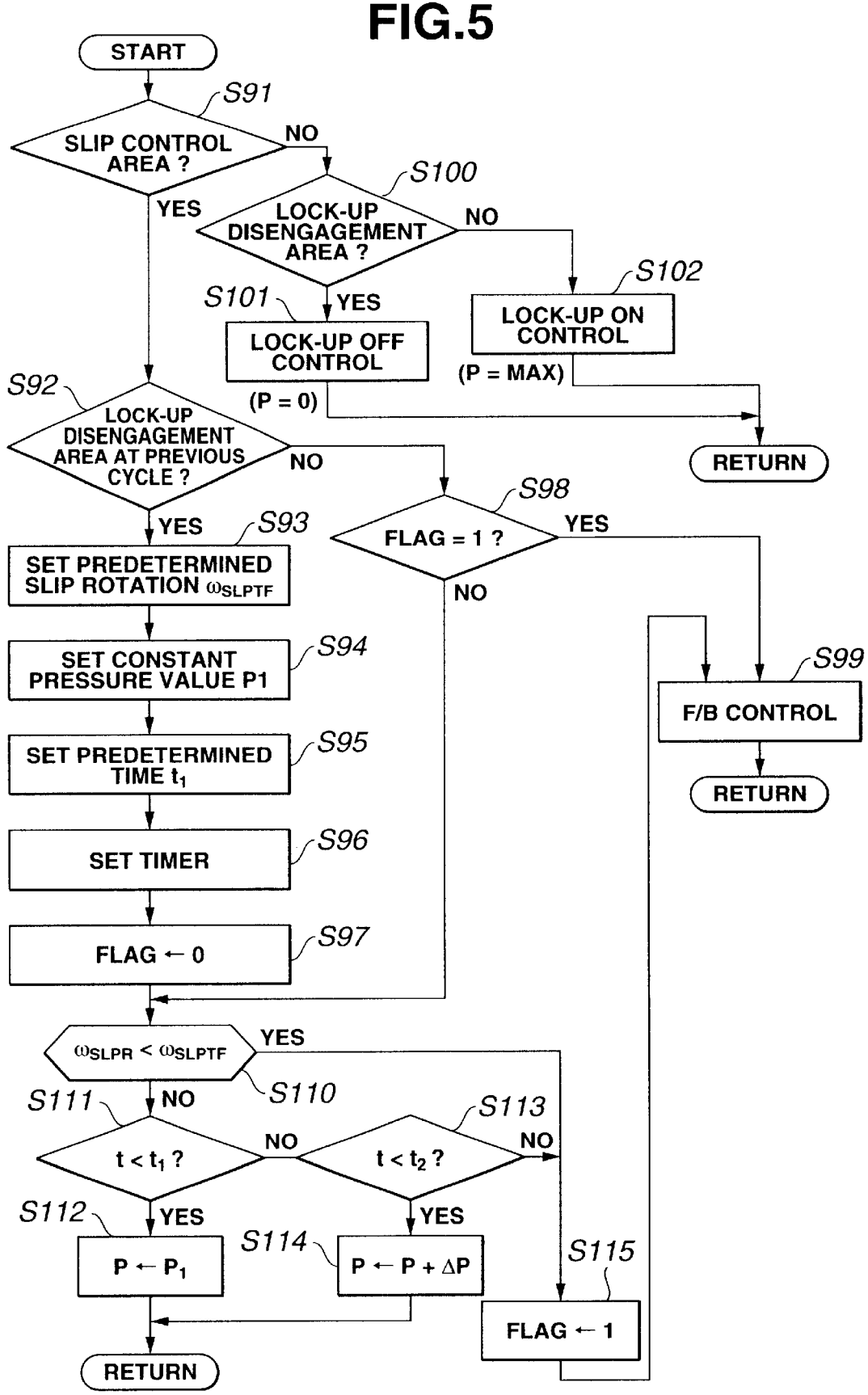
FIG. 5 is a flow chart illustrating a slip-rotation control program executed by a slip-rotation control section 90 shown in the block diagram of FIG. 3.

In the slip-rotation control program of FIG. 5, at step S91, a check is made to determine whether the lock-up torque converter is within slip-control area S/L. When the answer to step S91 is in the affirmative (YES), that is, during the slip-control state, step S92 occurs. At step S92, a check is made to determine whether the lock-up torque converter was within torque-converter action area C/V one cycle before. In other words, through step S92, a check is made to determine whether the torque converter has been shifted from torque-converter action area C/V to slip-control area S/L at the current cycle. When the answer to step S92 is affirmative (YES), that is, just before shifting from torque-converter action area C/V to slip-control area S/L, the routine proceeds from step S92 through steps 93, 94, 95, 96, and 97 to step S110. By way of steps 93–97, initialization for a predetermined slip rotation $\omega_{SLPTF}$ (i.e., a predetermined slip-rotation threshold value), a constant pressure value P1, a predetermined time t1, a count value of timer t, and feedback control flag FLAG is made. After step 110, feed-forward control is executed. Returning to step S92, when the answer to step S92 is in the negative (NO), that is, when the torque converter is within slip-control area S/L at the previous cycle, the routine proceeds from step S92 to step S98. At step S98, a check is made to determine whether feedback control that actual slip rotation $\omega_{SLPR}$ is brought or converged closer to compensated target slip rotation $\omega_{SLPTC}$ is executed, that is, whether feedback control flag FLAG is set (=1) or reset (=0). When the answer to step S98 is affirmative (YES), that is, when feedback control flag FLAG is set, during the feedback control mode, the routine flows from step S98 to step S99. At step S99, the feedback control mode is continued. Conversely when the answer to step S98 is negative (NO), that is, when feedback control flag FLAG is reset, during the non-feedback control mode, the routine flows from step S98 to step S110, so as to continuously execute the previously-noted feed-forward control. As the feedback control that actual slip rotation $\omega_{SLPR}$ is brought or converged closer to compensated target slip rotation $\omega_{SLPTC}$, generally, a PID control (a proportional-plus-integral-plus-derivative control with three terms) in which the control signal (output signal) is a linear combination (a sum) of the error signal (a proportional term corresponding to a deviation between actual slip rotation $\omega_{SLPR}$ and target slip rotation $\omega_{SLPT}$), its integral (an integrating term), and its derivative (a differentiating term), with an adjustable gain for each term, is used. In lieu thereof, another type of feedback control, such as a PI control, may be used.

At step S93, predetermined slip rotation (predetermined slip-rotation threshold value) $\omega_{SLPTF}$ is set or determined based on both required slip rotation $\omega_{SLPT0}$ and actual slip rotation $\omega_{SLPR}$. Concretely, predetermined slip rotation $\omega_{SLPTF}$ is arithmetically calculated from the following equation.

$$\omega_{SLPTF} = \omega_{SLPT0} + (\omega_{SLPR} - \omega_{SLPT0}) \times \alpha$$

where $\alpha$ denotes a predetermined ratio of the difference ($\omega_{SLPR} = \omega_{SLPT0}$) between actual slip rotation $\omega_{SLPR}$ and required slip rotation $\omega_{SLPT0}$, and the predetermined ratio denoted by a is a constant ranging from 0 to 1, that is, $0<\alpha<1$.

Figure 8:
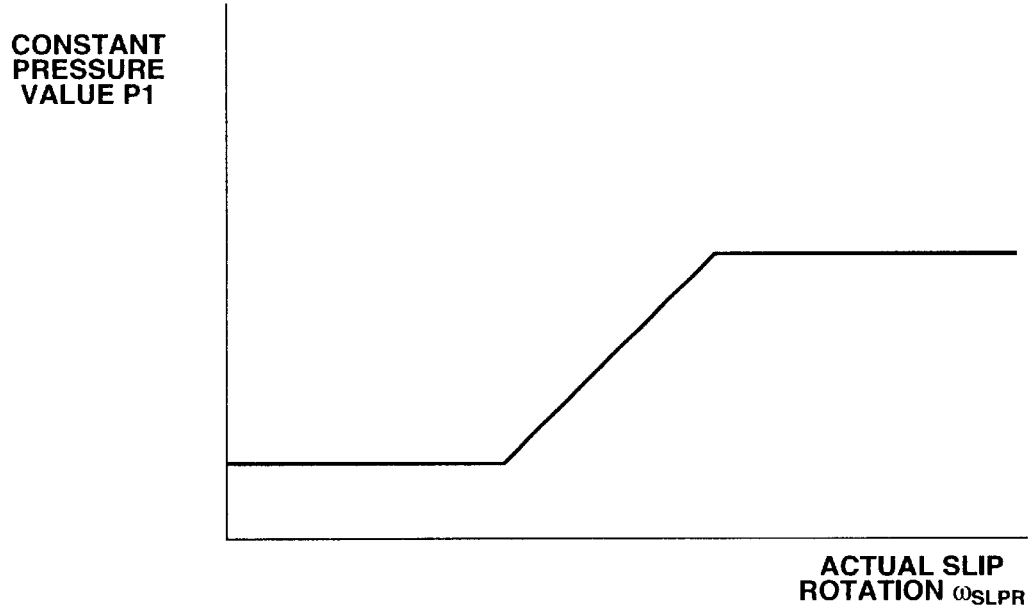
FIG. 8 is a preprogrammed characteristic map showing the relationship between an actual slip rotation $\omega_{SLPR}$ and a constant pressure value P1.

At step S94, constant pressure value P1 is set or determined based on the current value of actual slip rotation $\omega_{SLPR}$. As appreciated from the predetermined actual slip rotation $\omega_{SLPR}$ versus constant pressure value P1 characteristic map of FIG. 8, the greater the actual slip rotation $\omega_{SLPR}$, the higher the constant pressure value P1. Concretely, when actual slip rotation $\omega_{SLPR}$ is less than or equal to a first actual slip rotation, constant pressure value P1 is fixed to a predetermined first pressure value. When actual slip rotation $\omega_{SLPR}$ exceeds a second actual slip rotation relatively greater than the first actual slip rotation, constant pressure value P1 is fixed to a predetermined second pressure value higher than the predetermined first pressure value. When actual slip rotation $\omega_{SLPR}$ increases from the first actual slip rotation to the second actual slip rotation, constant pressure value P1 gradually rises substantially in a linear fashion.

Figure 9:
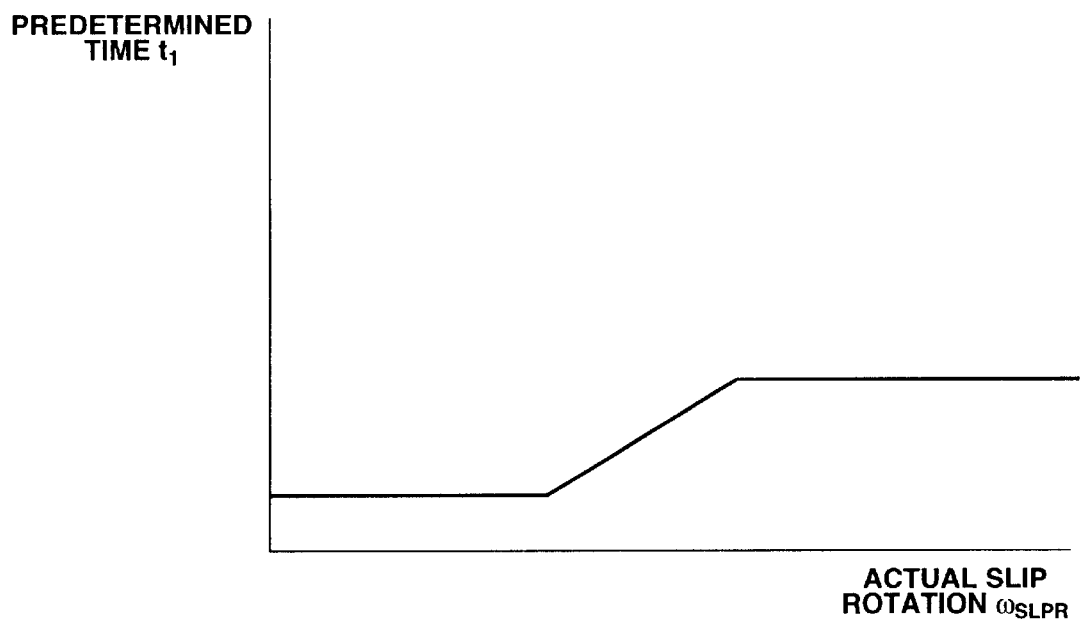
FIG. 9 is a preprogrammed characteristic map showing the relationship between an actual slip rotation $\omega_{SLPR}$ and a predetermined time t1.

At step S95, predetermined time t1 is set or determined based on the current value of actual slip rotation $\omega_{SLPR}$. As appreciated from the predetermined actual slip rotation $\omega_{SLPR}$ versus predetermined time t1 characteristic map of FIG. 9, the greater the actual slip rotation $\omega_{SLPR}$, the longer the predetermined time t1. Concretely, when actual slip rotation $\omega_{SLPR}$ is less than or equal to a first actual slip rotation, predetermined time t1 is fixed to a predetermined first time. When actual slip rotation $\omega_{SLPR}$ exceeds a second actual slip rotation relatively greater than the first actual slip rotation, predetermined time t1 is fixed to a predetermined second time higher than the predetermined first time. When actual slip rotation $\omega_{SLPR}$ increases from the first actual slip rotation to the second actual slip rotation, predetermined time t1 gradually increases substantially in a linear fashion.

At step S96, timer t is set to measure an elapsed time from the time just when the torque converter has been shifted or transferred from torque-converter action area C/V to slip-control area S/L.

At step S97, feedback control flag FLAG is reset o "0", for identification of the non-feedback control ode, in other words, for identification of the feedforward control mode.

At step S110, the current value of actual slip rotation $\omega_{SLPR}$ is compared to predetermined slip-rotation threshold value $\omega_{SLPTF}$ (set through step S93). When the current value of actual slip rotation $\omega_{SLPR}$ is less than predetermined threshold value $\omega_{SLPTF}$, that is, $\omega_{SLPR}<\omega_{SLPTF}$, step S115 is selected. Conversely when the current value of actual slip rotation $\omega_{SLPR}$ is greater than or equal to predetermined threshold value $\omega_{SLPTF}$, that is, $\omega_{SLPR}\geq\omega_{SLPTF}$, step S111 is selected. At step S111, a check is made to determine whether the count value of timer t is less than predetermined time t1 (set through step S95). When the count value of timer t is less than predetermined time t1, that is, t<t1, step S112 is selected. Conversely when the count value of timer t is greater than or equal to predetermined time t1, that is, t<t1, step S113 is selected. At step S112, lock-up clutch engagement pressure P is set at the constant pressure value P1 (set through step S94). At step S113, a check is made to determine whether the count value of timer t is compared to a predetermined maximum allowable time t2. When the count value of timer t is less than predetermined maximum allowable time t2, i.e., t<t2, step S114 is selected. Conversely when the timer count value is greater than or equal to predetermined maximum allowable time t2, that is, $t\geq t2$, step S115 is selected. At step S114, lock-up clutch engagement pressure P is incremented by a predetermined value $\Delta P$. In other words, the current value of lock-up clutch engagement pressure P is updated by the sum $(P+\Delta P)$ of the previous value of lock-up clutch engagement pressure P and predetermined value $\Delta P$. At step S115, feedback control flag FLAG is set to "1", and thereafter the routine proceeds from step S115 to step S99, so as to execute the feedback control.

Referring again to step S91, when the answer to step S91 is in the negative (NO), that is, during the on-slip-control state, step S100 occurs. At step S100, a check is made to determine whether the lock-up torque converter is within torque-converter action area C/V. When the answer to step S100 is in the affirmative (YES), that is, during the torque-converter state, step S101 occurs. At step S101, lock-up OFF control is executed so that lock-up clutch engagement pressure P $(=P_A-P_R)$ is controlled or adjusted to "0". When the answer to step S91 is in the negative (NO) and the answer to step S100 is in the negative (NO), that is, during the lock-up state, step S102 occurs. At step S102, lock-up ON control is executed so that lock-up clutch engagement pressure P is controlled or adjusted to the maximum pressure level.

The operation of slip control executed by the system of the embodiment is hereinafter described in reference to the time charts shown in FIGS. 10A–10D. As soon as the torque converter is shifted to slip-control area S/L at a time point of t=0, steps S93 through S97 are executed, and thus feedback control flag FLAG is reset to "0"for identification of the non-feedback control, and thereafter feed-forward control is started or executed. At the beginning of feedforward control, the timer count value is less than predetermined time t1, the routine flows from step S111 to step S112, and thus lock-up clutch engagement pressure P $(=P_A-P_R)$ is set to constant pressure value P1. Lock-up clutch engagement pressure P is continuously held at constant pressure value P1, while actual slip rotation $\omega_{SLPR}$ is greater than or equal to predetermined slip-rotation threshold value $\omega_{SLPTF}$ (i.e., $\omega_{SLPR}\geq\omega_{SLPTF}$) and additionally the timer count value is less than predetermined time t1 (i.e., t<t1). For such a time period from the time point t=0 to the time point t=t0 during which actual slip rotation $\omega_{SLPR}$ is greater than or equal to predetermined slip-rotation threshold value $\omega_{SLPTF}$ and additionally the timer count value is less than predetermined time t1, that is, in case of FLAG=0, $\omega_{SLPR}\geq\omega_{SLPTF}$ and t<t1, target slip rotation switching section 60 outputs actual slip rotation $\omega_{SLPR}$ as target slip rotation $\omega_{SLPT}$ (see the flow from step S61 to step S63 in FIG. 4). During the time period from t=0 to t=t0, feedback control is not yet started and therefore pre-compensator 70 is being initialized by target slip rotation $\omega_{SLPT}$ updated or replaced by actual slip rotation $\omega_{SLPR}$ (see step S63 of FIG. 4). After this, when actual slip rotation $\omega_{SLPR}$ becomes less than predetermined threshold value $\omega_{SLPTF}$ (see FIG. 10A) at the time t0, the routine of FIG. 5 proceeds from step S110 to step S115. Thus, at the time t0, feedback control flag FLAG is set to "1"and then step S99 takes place so that feedback control is started. The fact that actual slip rotation $\omega_{SLPR}$ reaches predetermined slip-rotation threshold value $\omega_{SLPTF}$ means that the difference $(\omega_{SLPR}-\omega_{SLPT0})$ between actual slip rotation $\omega_{SLPR}$ and required slip rotation $\omega_{SLPT0}$ both computed at the time t0 reaches the predetermined ratio $\alpha$ of the difference $(\omega_{SLPR}-\omega_{SLPT0})$ between actual slip rotation $\omega_{SLPR}$ and required slip rotation $\omega_{SLPT0}$ both computed at the time t=0 (as appreciated from the previously-described equation $\omega_{SLPTF}=\omega_{SLPT0}+(\omega_{SLPR}-\omega_{SLPT0})\times\alpha$, i.e., $(\omega_{SLPTF}-\omega_{SLPT0})=(\omega_{SLPR}-\omega_{SLPT0})\times\alpha$. The smaller the predetermined ratio $\alpha$, the less the difference between actual slip rotation $\omega_{SLPR}$ computed at the feedback control starting point t0 and required slip rotation $\omega_{SLPT0}$. Therefore, even when the feedback control system designed to be suitable for a change in required slip rotation $\omega_{SLPT0}$ within the feedback control area is used during shifting from torque-converter action area C/V to slip-control area S/L, owing to setting of predetermined ratio α to a comparatively smaller value, it is possible to provide a better transient characteristic during a transient state that actual slip rotation $\omega_{SLPR}$ begins to converge to required slip rotation $\omega_{SLPT0}$. However, if predetermined ratio α is set to an excessively small value (≈0), the feedback control starting point is undesirably retarded. Thus, it is preferable to properly set predetermined ratio α, taking into account a reduction in shocks occurring during application of lock-up clutch 2c and a short response time. At the feedback control starting point (see the time t0 of FIG. 10C), target slip rotation switching section 60 begins to output required slip rotation $\omega_{SLPT0}$ as target slip rotation $\omega_{SLPT}$ (see the flow from step S61 to step S62 in FIG. 4). From the feedback control starting point t0 (see FIG. 10C), pre-compensator 70 calculates compensated target slip rotation $\omega_{SLPTC}$ corresponding to the transient response from the time t=t0 at which pre-compensator 70 is still initialized by actual slip rotation $\omega_{SLPR}$ (target slip rotation $\omega_{SLPT}$) to a time when the previously-noted required slip rotation $\omega_{SLPT0}$ based on engine/vehicle operating conditions is reached. After t=t0, through step S99, feedback control is executed so that actual slip rotation $\omega_{SLPR}$ follows up compensated target slip rotation $\omega_{SLPTC}$ by controlling lock-up clutch engagement pressure P (=$P_A-P_R$) at the controlled duty ratio D.

As discussed above, FIGS. 10A–10D shows the example of slip control executed by the system of the embodiment in which actual slip rotation $\omega_{SLPR}$ becomes less than predetermined slip-rotation threshold value $\omega_{SLPTF}$ (at the time t0) before the timer count value measured from the shifting point from torque-converter action area C/V to slip-control area S/L reaches predetermined time t1. Depending on engine/vehicle operating conditions, there is a possibility that actual slip rotation $\omega_{SLPR}$ does not become less than predetermined slip-rotation threshold value $\omega_{SLPTF}$ even when the timer count value exceeds predetermined time t1. FIGS. 11A–11D show the example of slip control executed by the system of the embodiment under a condition in which actual slip rotation $\omega_{SLPR}$ is still greater than predetermined slip-rotation threshold value $\omega_{SLPTF}$ though the timer count value exceeds predetermined time t1.

As appreciated from the time charts of FIGS. 11A–11D, if step 111 determines that the timer count value exceeds predetermined time t1 in spite of the decision result of step S110 that actual slip rotation $\omega_{SLPR}$ still exceeds predetermined threshold value $\omega_{SLPTF}$, the slip-control routine proceeds from step S110 via step S111 to step S113. If step S113 determines that the timer count value is less than predetermined maximum allowable time t2, step S114 is selected to continue the feed-forward control. Concretely, through step S114, lock-up clutch engagement pressure P (=$P_A-P_R$) is incremented by predetermined pressure value ΔP. Conversely if step S113 determines that the timer count value exceeds predetermined maximum allowable time t2, step S115 is selected to terminate the feed-forward control and to initiate the feed-back control. Therefore, step S114 is continuously selected or cyclically executed while step S110 determines that actual slip rotation $\omega_{SLPR}$ exceeds predetermined threshold value $\omega_{SLPTF}$ and additionally step S113 determines that the timer count value is greater than predetermined time t1 and less than predetermined maximum allowable time t2. Thus, from just after t1 lock-up clutch engagement pressure P gradually increases due to the predetermined increment ΔP (see FIG. 11D). Owing to the gradual increase in lock-up clutch engagement pressure P, a drop in actual slip rotation $\omega_{SLPR}$ is effectively promoted, thus preventing an execution time of the feedforward control from being prolonged wastefully. After the time t0 when actual slip rotation $\omega_{SLPR}$ is less than predetermined slip-rotation threshold value $\omega_{SLPTF}$, feed-back control is executed so that actual slip rotation $\omega_{SLPR}$ follows up compensated target slip rotation $\omega_{SLPTC}$ by controlling lock-up clutch engagement pressure P (=$P_A-P_R$) at the controlled duty ratio D, in the same manner as the example of FIGS. 10A–10D.

Referring now to FIG. 12, there is shown comparison results between the variations in actual slip rotation $\omega_{SLPR}$ brought closer to compensated target slip rotation $\omega_{SLPTC}$ in the prior-art control system and variations in actual slip rotation $\omega_{SLPR}$ brought closer to compensated target slip rotation $\omega_{SLPTC}$ in the improved control system of the embodiment.

As appreciated from the lower control system characteristic curve of FIG. 12, in the prior-art control system, as soon as the torque converter is shifted from torque-converter action area C/V to slip-control area S/L at the time t=0, arithmetic-calculation for compensated target slip rotation $\omega_{SLPTC}$ is started. Owing to a response delay, actual slip rotation $\omega_{SLPR}$ does not vary at all until a certain time point ts. Thus, during a period of time from t=0 to t=ts, the difference between actual slip rotation $\omega_{SLPR}$ and compensated target slip rotation $\omega_{SLPTC}$ tends to increase. When actual slip rotation $\omega_{SLPR}$ begins to drop after the time ts, the difference between actual slip rotation $\omega_{SLPR}$ and compensated target slip rotation $\omega_{SLPTC}$ has already been great. From just after time point ts, compensated target slip rotation $\omega_{SLPTC}$ is being followed up. For the reasons discussed above, in the prior-art control system, the follow-up performance of actual slip rotation $\omega_{SLPR}$ toward compensated target slip rotation $\omega_{SLPTC}$ is deteriorated.

On the other hand, as appreciated from the upper control system characteristic curve of FIG. 12, in the control system of the embodiment, arithmetic-calculation for compensated target slip rotation $\omega_{SLPTC}$ is not yet started, just after shifting from torque-converter action area C/V to slip-control area S/L at the time t=0. In lieu thereof, the feed-forward control as described previously is started. Thereafter, at t=t0 when actual slip rotation $\omega_{SLPR}$ becomes less than predetermined slip-rotation threshold value $\omega_{SLPTF}$, arithmetic-calculation for compensated target slip rotation $\omega_{SLPTC}$ is started. That is to say, from t0, the follow-up control of actual slip rotation $\omega_{SLPR}$ toward compensated target slip rotation $\omega_{SLPTC}$, i.e., the slip-rotation feedback control is started. At this time, (at t0), lock-up clutch engagement pressure P (=$P_A-P_R$) has already become high enough to engage the lock-up clutch. Thus, there is a less response delay in actual slip rotation $\omega_{SLPR}$. Additionally, pre-compensator 70 is initialized by actual slip rotation $\omega_{SLPR}$ (target slip rotation $\omega_{SLPT}$) just before t0. Therefore, the difference ($\omega_{SLPR}-\omega_{SLPTC}$) between actual slip rotation $\omega_{SLPR}$ and compensated target slip rotation $\omega_{SLPTC}$ can be effectively suppressed or prevented from increasing, thus remarkably improving the follow-up performance of the slip control system.

As will be appreciated from the above, according to the slip control system of the present invention, during a specified time period from a time (t=0) when the torque converter is shifted from the torque-converter action area to the slip-control area to a time (t=t0) when actual slip rotation $\omega_{SLPR}$ becomes less than predetermined slip-rotation threshold value $\omega_{SLPTF}$, the lock-up clutch engagement pressure P $(=P_A-P_R)$ is determined by way of feedforward control. At the time (t=t0) when actual slip rotation $\omega_{SLPR}$ becomes less than predetermined slip-rotation threshold value $\omega_{SLPTF}$, the pre-compensator is initialized by the more recent data of actual slip rotation $\omega_{SLPR}$, and target slip rotation $\omega_{SLPT}$ is switched from actual slip rotation $\omega_{SLPR}$ to required slip rotation $\omega_{SLPT0}$ based on engine/vehicle operating conditions, and additionally feedback control is initiated so that actual slip rotation $\omega_{SLPR}$ is brought closer to compensated target slip rotation $\omega_{SLPTC}$. Due to the better timing of initialization of the pre-compensator and the better feedback control starting point, at the beginning of feedback control, it is possible to effectively suppress or prevent the difference between actual slip rotation $\omega_{SLPR}$ and compensated target slip rotation $\omega_{SLPTC}$ from wastefully undesiredly increasing. Additionally, it is possible to enhance the transient response characteristic obtained during a period of time in which actual slip rotation $\omega_{SLPR}$ is converging to target slip rotation $\omega_{SLPT}$ and thus a great influence is exerted upon the driver's feeling, utilizing the pre-compensator designed to be suitable for the time when target slip rotation $\omega_{SLPT}$ is changing in the slip-control area, without largely changing the construction of the pre-compensator itself as compared to the conventional pre-compensator equipped slip control system for a lock-up torque converter. According to the previously-described feedforward control, lock-up clutch engagement pressure P is, at an initial stage of feedforward control, risen immediately up to constant pressure value P1 at which the lock-up clutch is able to actually be engaged, and thereafter held at the constant pressure value until actual slip rotation $\omega_{SLPR}$ becomes less than predetermined slip-rotation threshold value $\omega_{SLPTF}$. This enhances the control system response. If actual slip rotation $\omega_{SLPR}$ does not become less than predetermined slip-rotation threshold value $\omega_{SLPTF}$ though a predetermined elapsed time t1 has already expired from the time when lock-up clutch engagement pressure P has been risen up to constant pressure value P1, the system is designed so that lock-up clutch engagement pressure P is gradually increased by predetermined value $\Delta P$, thereby promoting a drop in actual slip rotation $\omega_{SLPR}$ and thus preventing the execution time of feedforward control from being prolonged undesirably. In setting the previously-noted constant pressure value P1, if constant pressure value P1 is set at a relatively low pressure value, it is possible to more effectively reduce shocks at initial stages of engagement of the lock-up clutch. As appreciated, proper setting of constant pressure value P1 and/or predetermined value $\Delta P$ reconciles both reduced shocks during engagement of the lock-up clutch and shortened execution time of feedforward control.

Furthermore, in setting the previously-noted predetermined elapsed time t1, predetermined time t1 is variably set so that predetermined time t1 increases as the value of actual slip rotation $\omega_{SLPR}$ computed when shifting to the slip-control area increases, thereby optimizing a time rate of rise in lock-up clutch engagement pressure P. This contributes to reduced shocks during engagement of the lock-up clutch. In a similar manner, constant pressure value P1 is variably set so that constant pressure value P1 increases as the value of actual slip rotation $\omega_{SLPR}$ computed when shifting to the slip-control area increases, thereby reducing a delay in the feedback control starting point and improving the control responsiveness. Instead of variably setting the previously-noted constant pressure value P1 depending on the value of actual slip rotation $\omega_{SLPR}$ computed when shifting to the slip-control area, constant pressure value P1 may be set depending on estimated engine torque. Concretely, constant pressure value P1 is variably set so that constant pressure value P1 increases as the engine torque increases. However, there is an increased tendency for the engine torque to fluctuate owing to changes in engine-accessories loads. In other words, the estimated engine torque data contains some errors arising from changes in engine-accessories loads. Therefore, the use of actual slip rotation $\omega_{SLPR}$ of the torque converter, accurately reflecting input torque actually transmitted to the torque converter, is superior to the use of the estimated engine torque, from the viewpoint of enhanced control accuracy. Moreover, in setting predetermined slip-rotation threshold value $\omega_{SLPTF}$ needed to compare to actual slip rotation $\omega_{SLPR}$, predetermined slip-rotation threshold value $\omega_{SLPTF}$ is variably set on the basis of both required slip rotation $\omega_{SLPT0}$ and actual slip rotation $\omega_{SLPR}$, in such a manner that the difference $(\omega_{SLPTF}-\omega_{SLPT0})$ between predetermined slip-rotation threshold value $\omega_{SLPTF}$ and required slip rotation $\omega_{SLPT0}$ is identical to the predetermined ratio 60 of the difference $(\omega_{SLPR}-\omega_{SLPT0})$ between actual slip rotation $\omega_{SLPR}$ and required slip rotation $\omega_{SLPT0}$ both computed at the time t=0 at which the torque converter is shifted to the slip-control area, (see the aforementioned equation $\omega_{SLPTF}=\omega_{SLPT0}+(\omega_{SLPR}-\omega_{SLPT0})\times\alpha$, that is to say, $(\omega_{SLPTF}-\omega_{SLPT0})=(\omega_{SLPR}-\omega_{SLPT0})\times\alpha$). Therefore, in particular, when the value of actual slip rotation $\omega_{SLPR}$ computed at the feedback control starting point (t=t0) is great, predetermined slip-rotation threshold value $\omega_{SLPTF}$, that is, the actual slip rotation $\omega_{SLPR}$ computed at the shifting time (t=0) to the slip-control area is also great. Thus, it is possible to prevent the feedback control starting point from being undesirably retarded.

The entire contents of Japanese Patent Application No. P2000-328474 (filed Oct. 27, 2000) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A slip control system for a torque converter employing a lock-up clutch, comprising:

a pre-compensator that determines a follow-up characteristic of an actual value of a controlled quantity to a desired value of slip rotation between input and output elements of the torque converter and makes a filtering process to a target slip rotation corresponding to the desired value of slip rotation to produce a compensated target slip rotation;

a feedforward control section that increases a lock-up clutch engagement pressure by way of feedforward control during a period of time from a time when the torque converter is shifted from a torque-converter action area to a slip-control area to a time when an actual slip rotation corresponding to the actual value of the controlled quantity becomes less than a predetermined slip-rotation threshold value;

a feedback control section that controls the lock-up clutch engagement pressure by way of feedback control from the time when the actual slip rotation becomes less than the predetermined slip-rotation threshold value after shifting to the slip-control area, so that the actual slip rotation is brought closer to the compensated target slip rotation;

the pre-compensator being initialized by the actual slip rotation at the time when the actual slip rotation becomes less than the predetermined slip-rotation threshold value after shifting to the slip-control area; and a target slip rotation switching section that switches the target slip rotation from the actual slip rotation to a required slip rotation based on engine and vehicle operating conditions at the time when the actual slip rotation becomes less than the predetermined slip-rotation threshold value after shifting to the slip-control area.

2. The slip control system as claimed in claim 1, wherein the feedforward section executes the feedforward control so that the lock-up clutch engagement pressure is raised immediately up to a constant pressure value at which the lock-up clutch is able to be engaged, and thereafter held at the constant pressure value until the actual slip rotation becomes less than the predetermined slip-rotation threshold value.

3. The slip control system as claimed in claim 2, wherein the feedforward control section gradually increases the lock-up clutch engagement pressure when the actual slip rotation exceeds the predetermined slip-rotation threshold value though a predetermined time has expired from a time when the lock-up clutch engagement pressure has been raised up to the constant pressure value.

4. The slip control system as claimed in claim 3, wherein the predetermined time is variably set so that the predetermined time increases as the actual slip rotation calculated when shifting from the torque-converter action area to the slip-control area increases.

5. The slip control system as claimed in claim 2, wherein the constant pressure value is variably set so that the constant pressure value increases as the actual slip rotation calculated when shifting from the torque-converter action area to the slip-control area increases.

6. The slip control system as claimed in claim 1, wherein the predetermined slip-rotation threshold value is variably set based on both the required slip rotation and the actual slip rotation, in such a manner that a difference between the predetermined slip-rotation threshold value and the required slip rotation is identical to a predetermined ratio of the difference between the actual slip rotation and the required slip rotation both calculated at a time at which the torque converter is shifted from the torque-converter action area to the slip-control area.

7. The slip control system as claimed in claim 3, wherein the feedforward control section terminates the feedforward control and the feedback control section initiates the feedback control when the actual slip rotation exceeds the predetermined slip-rotation threshold value though a predetermined maximum allowable time longer than the predetermined time has expired from the time when the lock-up clutch engagement pressure has been raised up to the constant pressure value.

8. A slip control system for a torque converter employing a lock-up clutch, comprising:

a pre-compensating means for determining a follow-up characteristic of an actual value of a controlled quantity to a desired value of slip rotation between input and output elements of the torque converter and for making a filtering process to a target slip rotation corresponding to the desired value of slip rotation to produce a compensated target slip rotation;

a feedforward control means for increasing a lock-up clutch engagement pressure by way of feedforward control during a period of time from a time when the torque converter is shifted from a torque-converter action area to a slip-control area to a time when an actual slip rotation corresponding to the actual value of the controlled quantity becomes less than a predetermined slip-rotation threshold value;

a feedback control means for controlling the lock-up clutch engagement pressure by way of feedback control from the time when the actual slip rotation becomes less than the predetermined slip-rotation threshold value after shifting to the slip-control area, so that the actual slip rotation is brought closer to the compensated target slip rotation;

the pre-compensating means being initialized by the actual slip rotation at the time when the actual slip rotation becomes less than the predetermined slip-rotation threshold value after shifting to the slip-control area; and a target slip rotation switching means for switching the target slip rotation from the actual slip rotation to a required slip rotation based on engine and vehicle operating conditions at the time when the actual slip rotation becomes less than the predetermined slip-rotation threshold value after shifting to the slip-control area.

9. A method for controlling slip rotation between input and output elements of a torque converter employing a lock-up clutch, the method comprising:

determining a filter constant by which a transient response is determined;

pre-compensating a target slip rotation corresponding to a desired value of slip rotation at the filter constant by way of a pre-compensator to produce a compensated target slip rotation;

feedforward-controlling a lock-up clutch engagement pressure to increase the lock-up clutch engagement pressure during a period of time from a time when the torque converter is shifted from a torque-converter action area to a slip-control area to a time when an actual slip rotation corresponding to an actual value of a controlled quantity becomes less than a predetermined slip-rotation threshold value;

feedback-controlling the lock-up clutch engagement pressure from the time when the actual slip rotation becomes less than the predetermined slip-rotation threshold value after shifting to the slip-control area, so that the actual slip rotation is brought closer to the compensated target slip rotation;

initializing the pre-compensator by the actual slip rotation at the time when the actual slip rotation becomes less than the predetermined slip-rotation threshold value after shifting to the slip-control area; and switching the target slip rotation from the actual slip rotation to a required slip rotation based on engine and vehicle operating conditions at the time when the actual slip rotation becomes less than the predetermined slip-rotation threshold value after shifting to the slip-control area.

10. A method for controlling slip rotation between input and output elements of a torque converter employing a lock-up clutch, the method comprising:

determining, based on a throttle opening and a transmission output speed, whether the torque converter is in a torque-converter action area, in a slip-control area, or in a lock-up engagement area;

calculating a required slip rotation based on the throttle opening and a turbine speed;

calculating an actual slip rotation as a difference between a pump-impeller speed and the turbine speed;

determining a filter constant by which a transient response is determined;

pre-compensating a target slip rotation corresponding to a desired value of slip rotation at the filter constant by way of a pre-compensator to produce a compensated target slip rotation;

switching the target slip rotation from the actual slip rotation to the required slip rotation at the time when the actual slip rotation becomes less than a predetermined slip-rotation threshold value after shifting from the torque-converter action area to the slip-control area;

feedforward-controlling a lock-up clutch engagement pressure to increase the lock-up clutch engagement pressure during a period of time from a time when the torque converter is shifted from the torque-converter action area to the slip-control area to a time when the actual slip rotation corresponding to an actual value of a controlled quantity becomes less than the predetermined slip-rotation threshold value;

feedback-controlling the lock-up clutch engagement pressure from the time when the actual slip rotation becomes less than the predetermined slip-rotation threshold value after shifting to the slip-control area, so that the actual slip rotation is brought closer to the compensated target slip rotation; and initializing the pre-compensator by the actual slip rotation at the time when the actual slip rotation becomes less than the predetermined slip-rotation threshold value after shifting to the slip-control area.

11. A slip control system for a torque converter employing a lock-up clutch, comprising:

a slip-control area section that determines whether the torque converter is in a torque-converter action area or in a slip-control area according to a throttle opening and a vehicle speed;

a feedforward control section that increases a lock-up clutch engagement pressure by way of feedforward control for a predetermined period when the torque converter is shifted from the torque-converter action area to the slip-control area;

a required slip rotation calculation section that calculates a required slip rotation between input and output elements of the torque converter based on engine operating conditions;

a pre-compensator that determines a controlled transient characteristic of an actual slip rotation to the required slip rotation and makes a compensated target slip rotation corresponding to the controlled transient characteristic after the predetermined period; and a feedback control section that controls the lock-up clutch engagement pressure by way of feedback control so that the actual slip rotation is brought closer to the compensated target slip rotation.

12. The slip control system as claimed in claim 11, wherein the feedforward control section gradually increases the lock-up clutch engagement pressure during the predetermined period.

13. The slip control system as claimed in claim 11, wherein the predetermined period is variably set so that the predetermined period increases as the actual slip rotation calculated when shifting from the torque-converter action area to the slip-control area increases.

14. The slip control system as claimed in claim 11, wherein the feedforward control section executes the feedforward control so that the lock-up clutch engagement pressure is raised immediately up to a constant pressure value at which the lock-up clutch is able to be engaged, and thereafter held at the constant pressure value until the actual slip rotation becomes less than the predetermined slip-rotation threshold value.

15. The slip control system as claimed in claim 14, wherein the constant pressure value is variably set so that the constant pressure value increases as the actual slip rotation calculated when shifting from the torque-converter action area to the slip-control area increases.

16. A slip control system for a torque converter employing a lock-up clutch, comprising:

a slip-control area section that determines whether the torque converter is in a torque-converter action area or in a slip-control area according to a throttle opening and a vehicle speed;

a feedforward control section that increases a lock-up clutch engagement pressure by way of feedforward control when the torque converter is shifted from the torque-converter action area to the slip-control area;

a required slip rotation calculation section that calculates a required slip rotation between input and output elements of the torque converter based on engine operating conditions;

a pre-compensator that determines a controlled transient characteristic of an actual slip rotation to the required slip rotation and makes a compensated target slip rotation corresponding to the controlled transient characteristic when the actual slip rotation becomes less than a predetermined slip rotation; and a feedback control section that controls the lock-up clutch engagement pressure by way of feedback control so that the actual slip rotation is brought closer to the compensated target slip rotation.

17. he slip control system as claimed in claim 16, wherein the feedforward control section executes the feedforward control so that the lock-up clutch engagement pressure is raised immediately up to a constant pressure value at which the lock-up clutch is able to be engaged, and thereafter held at the constant pressure value until the actual slip rotation becomes less than the predetermined slip-rotation threshold value.

18. The slip control system as claimed in claim 17, wherein the constant pressure value is variably set so that the constant pressure value increases as the actual slip rotation calculated when shifting from the torque-converter action area to the slip-control area increases.

19. The slip control system as claimed in claim 17, wherein the feedforward control section gradually increases the lock-up clutch engagement pressure when the actual slip rotation exceeds the predetermined slip-rotation threshold value though a predetermined time has expired from a time when the lock-up clutch engagement pressure has been raised up to the constant pressure value.

20. The slip control system as claimed in claim 19, wherein the predetermined time is variably set so that the predetermined time increases as the actual slip rotation calculated when shifting from the torque-converter action area to the slip-control area increases.

* * * * *